(12) United States Patent
Gill

(10) Patent No.: US 6,311,592 B1
(45) Date of Patent: Nov. 6, 2001

(54) LOADER FOR SPROCKET WHEELS AND METHOD TO AUTOMATICALLY POSITION DOUBLE-TOOTHING SPROCKET WHEELS USING THE LOADER

(75) Inventor: Ralph Sheridan Gill, La Bruyere (GB)

(73) Assignee: Technologies Research Holding S.A., Ruegiesener (LU)

(*) Notice: Subject to any disclaimer, the term of this patent is extended or adjusted under 35 U.S.C. 154(b) by 0 days.

(21) Appl. No.: 09/568,533

(22) Filed: May 10, 2000

Related U.S. Application Data

(63) Continuation of application No. PCT/GB98/03300, filed on Nov. 4, 1998.

(30) Foreign Application Priority Data

Nov. 12, 1997 (GB) .................................................. 9723919

(51) Int. Cl.[7] .................................................. B23B 13/00
(52) U.S. Cl. ................................ 82/124; 82/125; 82/162; 82/167
(58) Field of Search ........................... 82/124, 125, 162, 82/164, 167; 414/14, 17, 18; 409/274

(56) References Cited

U.S. PATENT DOCUMENTS

| | | | |
|---|---|---|---|
| 3,469,295 | * | 9/1969 | Gain .................................... 82/125 X |
| 4,487,568 | * | 12/1984 | Wiatt et al. ......................... 425/534 |
| 4,671,784 | * | 6/1987 | Duck .................................... 493/29 |
| 5,222,285 | * | 6/1993 | Horikawa ........................... 82/124 X |

FOREIGN PATENT DOCUMENTS 274 382 A    12/1989   (DE) .

OTHER PUBLICATIONS

"MAAG–Taschenbuch" 1985, MAAG–Zahnräder AG, Zurich (CH), XP002090922 156900, p. 536, II. 5–10, Fig. 11.16.

F. Opitz, "Handbuch Verzahntechnik" 1981, VEB Verlag Technik, Berlin (DE), XP002090923 13244, Section 11.3.2 "Wälzstossmaschine mit Magazin und Werkstückwechsel", pp. 397–398, Figs. 11.3 and 11.4.

* cited by examiner

Primary Examiner—Henry Tsai
(74) Attorney, Agent, or Firm—Akin, Gump, Strauss, Hauer & Feld, L.L.P.

(57) ABSTRACT

A sprocket wheel or double helical gear loader for a machine which generates gears by pinion shaped cutters. The machine includes a gear bearing table having a centering device and a rotatable supporting base. The loader includes a turntable which advances step-by-step about an axis of rotation of the base. The turntable includes on its periphery a plurality of gear holders, which can be intermittently positioned at cutting stations and a discharge station of completed gears. A gear is secured to the turntable through gripping arms, which surround the gear about a whole of the gear perimeter except for an aperture. A cutter passes through the aperture. The gripping arms are movable to accommodate gears of different sizes.

7 Claims, 3 Drawing Sheets

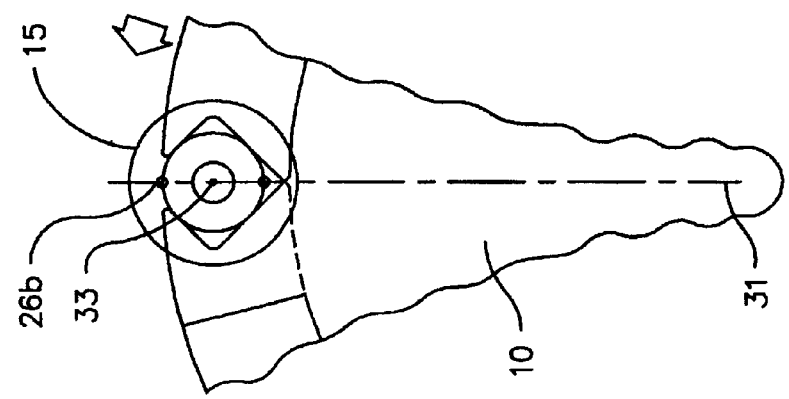
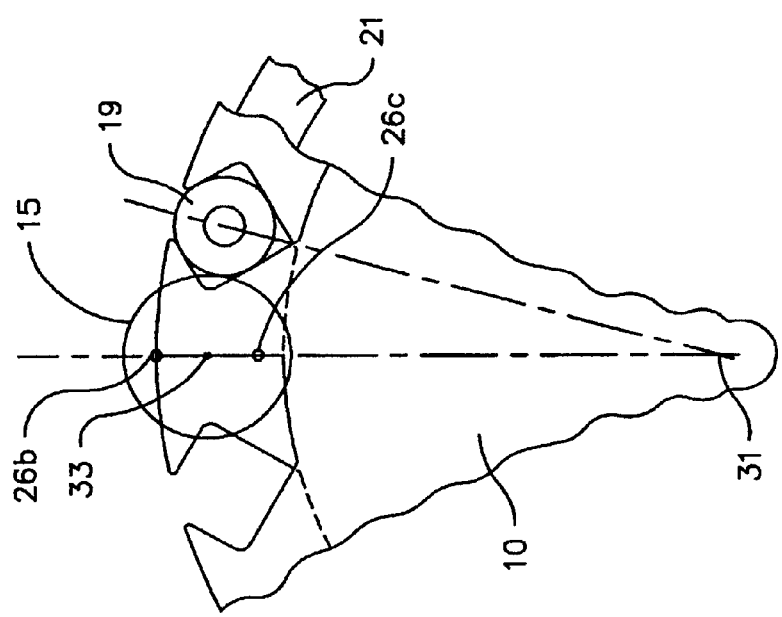
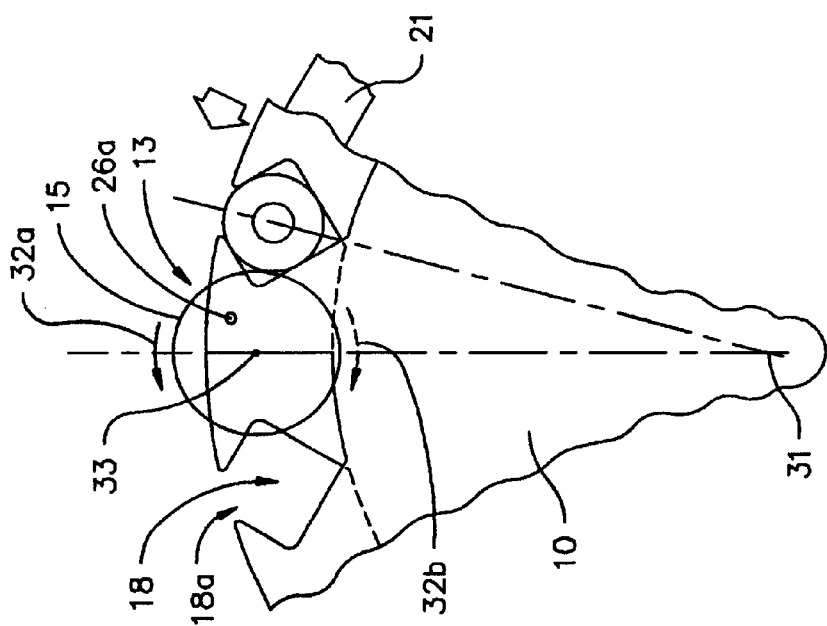

LOADER FOR SPROCKET WHEELS AND METHOD TO AUTOMATICALLY POSITION DOUBLE-TOOTHING SPROCKET WHEELS USING THE LOADER

CROSS REFERENCE TO RELATED APPLICATION

This Application is a continuation of International Application PCT/GB98/03300, filed Nov. 4, 1998, the disclosure of which is incorporated herein by reference.

BACKGROUND OF THE INVENTION

This invention concerns a loader for sprocket wheels, and also the method to automatically position double-toothing sprocket wheels which use the loader, as set forth in the respective main claims.

The invention is used in machines to produce single-toothing or double-toothing sprocket wheels generated by cutting blades or pinion instruments.

The invention may cooperate with centering devices employed in the case of sprocket wheels with double, straight or bi-helical toothing, wherein the second ring is produced in a subsequent step to the production of the first ring.

The invention is used to carry the pieces to be worked, automatically and in sequence, into correspondence with the operating station of the pinion instrument and subsequently to discharge the completed sprocket wheels from this station, at the same time positioning a new piece to be worked.

The state of the art covers positioning and centering assemblies employed in the production of sprocket wheels; such assemblies substantially comprise a supporting base cooperating with a shaft for the axial positioning and clamping of the piece, and are associated with a pinion instrument acting peripherally to the piece to form teeth thereon.

The unrefined piece is arranged on the supporting base on which it is then made to rotate, while the shaft clamps it in position.

While the piece is rotating the pinion instrument works the piece, rotating and moving alternately and in coordination with the rotation of the supporting base.

In order to work the pieces the worker must load the piece each time onto the supporting base at the beginning of the operation and must remove the piece when the work has been concluded.

These loading and unloading operations considerably slow down the production cycle; it must also be considered that a single worker has to look after two or more machines, and therefore the efficiency of these machines is considerably reduced.

In the production of double-toothing sprocket wheels, or sprocket wheels comprising two rings of teeth which are symmetrical to the median transverse plane of the piece, the worker is obliged to further position the piece in the course of his work since the two rings are made in two different steps and normally on two different machines.

When the second ring has to be made, the piece has to be angularly positioned with extreme precision with respect to the pinion instrument in order to obtain the desired, accurate reciprocal positioning between the teeth of the two rings.

This involves a further lengthening of the working times, with a consequent slow down of the production cycle, a reduction in the efficiency of the machines and an increase in production costs.

WO 88/05364 describes a rotary loader for pieces to be machine-worked, which comprises seatings, open towards the outside, wherein the piece is inserted.

These seatings are delimited by clamping elements, for example wedge-shaped, screwed to the body of the loader and which act under pressure on the side of the piece to be worked.

This kind of loader entails long, complex operations to insert the piece and adapt the size of the seating, which require the wedge-shaped elements to be disassembled.

Moreover, the range of sizes and shapes of the pieces which can be worked is very limited, inasmuch as it is not possible to vary by much the size and the shape of the seating, except by using differentiated clamping elements for every size of piece.

Furthermore, in the housing seatings the pieces to be worked are, for a substantial portion, arranged outside the seating, which can cause knocks or damage during the complete rotation of the loader.

The present applicants have designed, tested and embodied this invention to overcome the shortcomings of the state of the art and to achieve further advantages.

SUMMARY OF THE INVENTION

The invention is set forth and characterised in the respective main claims, while the dependent claims describe other characteristics of the idea of the main embodiment.

The purpose of the invention is to achieve a loader for sprocket wheels which will allow the pieces which have been worked or still have to be worked to be positioned in/removed from the operating zone quickly and automatically.

Another purpose of the invention is to limit the inactivity of the pinion instrument between two successive operations, limiting manual intervention to a minimum, reducing dead times of the working cycle, increasing the efficiency of the machines and reducing production costs.

A further purpose is to obtain an automatic positioning method, when working with double-toothing sprocket wheels and cooperating with a centering device, which will ensure the precise angular positioning of the piece in order to begin making the second ring.

The loader according to the invention may be associated with an assembly to position and center the pieces which form the sprocket wheels, and cooperates with the supporting base.

The loader comprises a turntable element which has on its periphery a plurality of housing seatings suitable to contain the pieces which are to be worked in order to form the sprocket wheels.

According to a variant, the turntable is defined by a rotary ring or by a conveyor belt including the plurality of seatings on its periphery.

Each housing seating has at least a front-aperture of a size mating with the size of the pinion instrument, so that the pinion instrument can work without coming into contact with the loader.

According to a variant, the housing seatings are slightly wider than the diameter of the piece to be worked so as to determine a desired play between the housing seating and the relative piece.

According to another variant, the housing seatings have a width which is variable and/or can be adjusted to allow pieces of a different diameter to be housed therein.

According to another variant, the turntable element cooperates with an underlying sliding support and the pieces to be worked, arranged inside the housing seatings, lie thereon.

At the beginning of the cycle, the pieces to be worked are arranged in the housing seatings of the turntable element; the latter is then made to rotate until it places a first piece in correspondence with the operating station of the pinion instrument; once the piece is centered and clamped onto the supporting base, work thereon begins according to conventional methods, with a rotation of the piece-bearing table and the sequential formation of the teeth.

It is possible to perform this work thanks to the presence of the front aperture of the housing seating, which allows the pinion instrument to be inserted onto the piece which is to be worked.

When this operation is complete, the piece is freed from the grip of the machine and the turntable element is rotated once more, the sprocket wheel which has just been formed is discharged from the operating station and at the same time a new piece is brought into correspondence with the operating station.

While the other piece is being worked, the first sprocket wheel can be removed from the relative housing seating and replaced by a new piece which is to be worked.

According to the invention, in the case of a double-toothing wheel, the loader cooperates with centering means, rotationally solid with the piece-bearing table, suitable to automatically position in a correct manner the piece being worked with respect to the pinion instrument in order to make the second ring of teeth according to the desired reciprocal angular positioning of the teeth of the two rings.

According to this embodiment, the centering means, which can be in any circumferential point whatsoever with respect to the piece which has just been worked, are rotated through a desired arc, after the completed piece has been discharged, by means of rotating the piece-bearing table.

This rotation is used to carry the centering means into alignment with the straight line orthogonal to the inner and outer lines tangent to the ideal position of the piece to be worked on the piece-bearing table.

In the case of a circular loader, with an axis of rotation parallel to the axis of rotation of the piece-bearing table, the straight line is the conjunction of the two centres of rotation, respectively of the loader and of the piece-bearing table.

Subsequently, the loader advances and positions the new piece, on which the second ring has to be made, in correspondence with the axis of rotation of the piece-bearing table.

As the loader advances, the centering means comes into contact with a groove or tooth of the first ring which is already complete and defines the precise angular reference position of the piece from which to start working; it is in this position that the loader stops and that working starts.

This definition of the reference position involves a rotation of the piece which is caused by the contact of the centering means and at least one tooth of the first ring.

BRIEF DESCRIPTION OF THE SEVERAL VIEWS OF THE DRAWINGS

The attached Figures are given as a non-restrictive example and show a preferred embodiment of the invention as follows:

FIGS. 4a, 4b and 4c show diagrammatically the steps the loader takes to position a double-toothing sprocket wheel whose second ring has yet to be made.

DETAILED DESCRIPTION OF THE INVENTION

Figure 1:
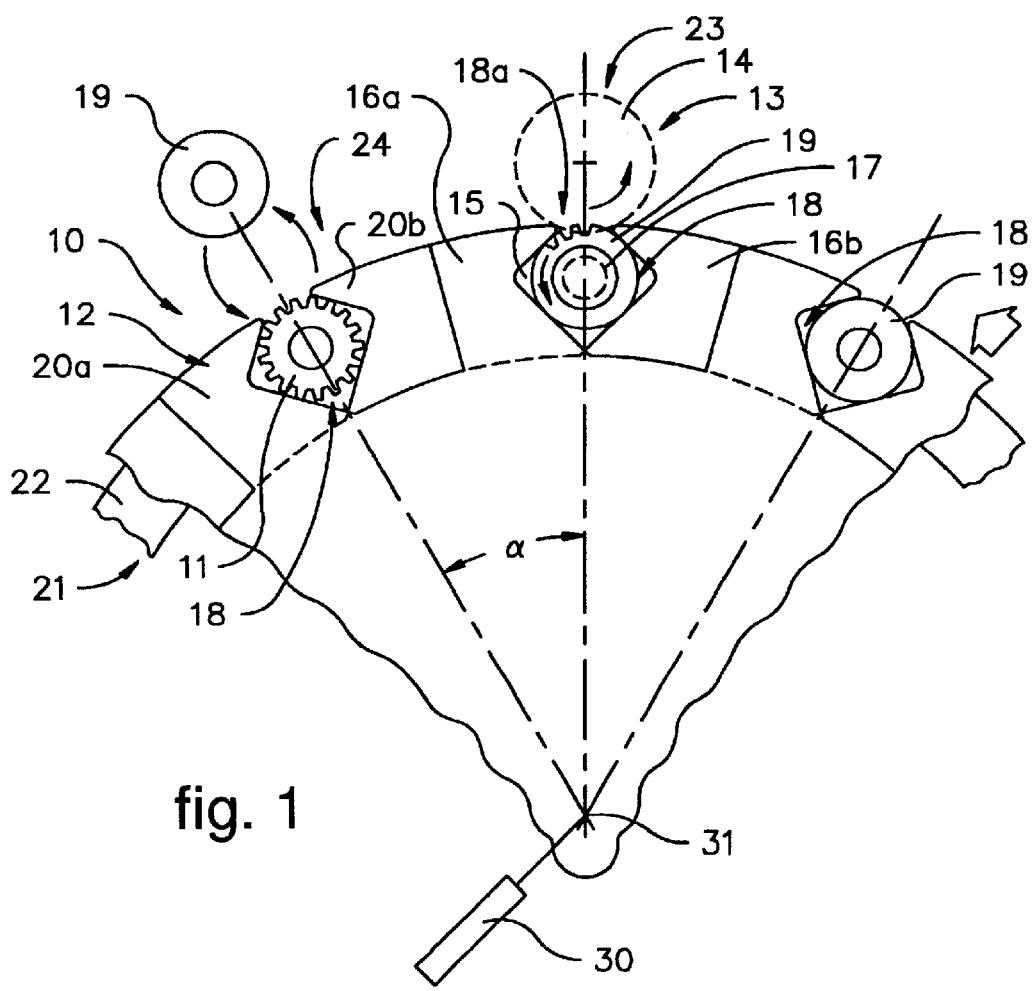
FIG. 1 is a part view from above of a loader for sprocket wheels according to the invention.

With reference to the attached Figures, the reference number 10 denotes generally the loader for sprocket wheels 11 according to the invention, which comprises a turntable element 12 cooperating with a positioning/centering assembly 13.

In this description we shall refer to a positioning/centering assembly 13 comprising a piece-bearing table with a substantially horizontal supporting base 15, a clamping shaft 17 which is axially inserted inside the central hole of the piece and an underlying cavity made on the supporting base 15.

This embodiment however does not limit the field of the invention to variants wherein the supporting base is vertical or in any case oblique, or wherein the piece has no hole and the shaft clamps it on the supporting base by means of tailstocks.

Moreover, we shall refer to a loader of the circular type rotating around an axis of rotation 31 substantially parallel to the axis of rotation 33 of the piece-bearing table even if, in variants which are not shown here, the loader 10 can have substantially any configuration whatsoever, not only circular.

In this case, the turntable element 12 is arranged above the supporting base 15 and in a position of non-contact with the pinion instrument 14 and is made to advance by the desired value by command means 30 of the type known to the state of the art.

The turntable element 12 includes on its periphery a plurality of housing seatings 18 for the pieces 19 to be worked to obtain the sprocket wheels 11.

The housing seatings 18 have a frontal aperture 18a through which the pinion instrument 14 passes.

In this case, the turntable element 12 consists of two disks, the first upper disk 16a and the second lower disk 16b, keyed onto the axis of rotation 31 of the loader 10.

Advantageously, in the operating position the axis 31 is substantially on the plane which contains the axis of the pinion instrument 14 and the axis of the piece 19 which is to be worked.

Each of the two disks 16a, 16b has on its periphery retaining and containing means consisting of mating gripping arms, respectively 20a and 20b, which are arc-shaped and together define the housing seatings 18 for the pieces 19.

The gripping arms 20a, 20b surround the piece 19 substantially for the whole of its perimeter, except for the front aperture 18a.

The two disks 16a, 16b can be rotated in both directions in a reciprocally independent manner and with respect to the axis of rotation 31; it is thus possible to vary the width of the housing seatings 18 according to the diameter of the pieces 19 to be worked.

The housing seatings 18 also have an automatic self-centering and positioning function so that the axis of the piece 19 lies substantially always around the same circumference and the piece 19 arrives at the work station already in the correct position.

In this case, in a position underneath the turntable element 12, the loader 10 has a sliding support 21, complanar with respect to the plane 15a of the supporting base 15, and developing in correspondence with the housing seatings 18. In this case, the sliding support 21 consists of an annular guide 22.

At the beginning of the production cycle, the disks 16a, 16b are rotated in the appropriate manner one with respect to the other in order to correctly define the width of the housing seatings 18, according to the diameter of the pieces 19 to be inserted; as this adjustment is made, a desired play is allowed in the connection between the housing seatings 18 and the pieces 19 so that the latter can rotate around their axis even though they are contained in the housing seatings 18.

Inside each housing seating 18 a piece 19 is therefore arranged resting on the sliding support 21, and the turntable element 12 is made to rotate by a desired value α corresponding to the angular distance between two of the housing seatings 18 so as to bring a first piece 19 in correspondence with the operating station 23.

As the turntable element 12 rotates, the pieces 19 resting on the sliding support 21 are drawn by the disks 16a, 16b.

Figure 2:
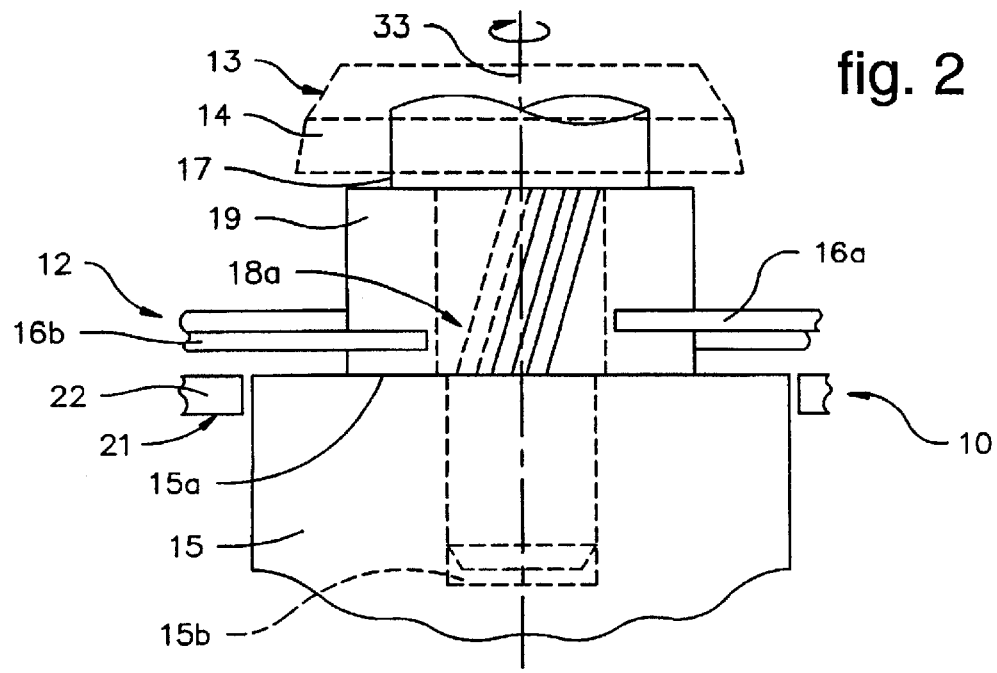
FIG. 2 is a part view from "A" of the loader shown in FIG. 1.

The shaft 17, suitable to axially clamp the piece 19 to the supporting base 15 while it is being worked, is then lowered and inserted into the relative coupling cavity 15b on the supporting base 15 (FIG. 2).

The supporting base 15 then begins to rotate in coordination with the pinion instrument 14 so as to work the piece 19; the pinion instrument 14 gains access to the piece 19 through the front aperture 18a of the housing seatings 18.

When a first sprocket wheel 11 has been completed, the turntable element 12 rotates, carrying a new piece 19 into correspondence with the operating station 23 so that work can be started on it, while at the same time the completed sprocket wheel 11 is taken into correspondence with a discharge/replacement station 24 (FIG. 1).

In the discharge/replacement station 24 the sprocket wheel 11 is removed from the relative housing seating 18 and replaced by a new piece 19 to be worked.

In this way, the invention provides a substantially continuous production cycle which limits to a minimum any inactive times of the pinion instrument 14, greatly reduces the need for manual intervention and gives the machine considerable autonomy according to the number of pieces 19 which have to be worked and which are contained in the loader 10.

Figure 3:
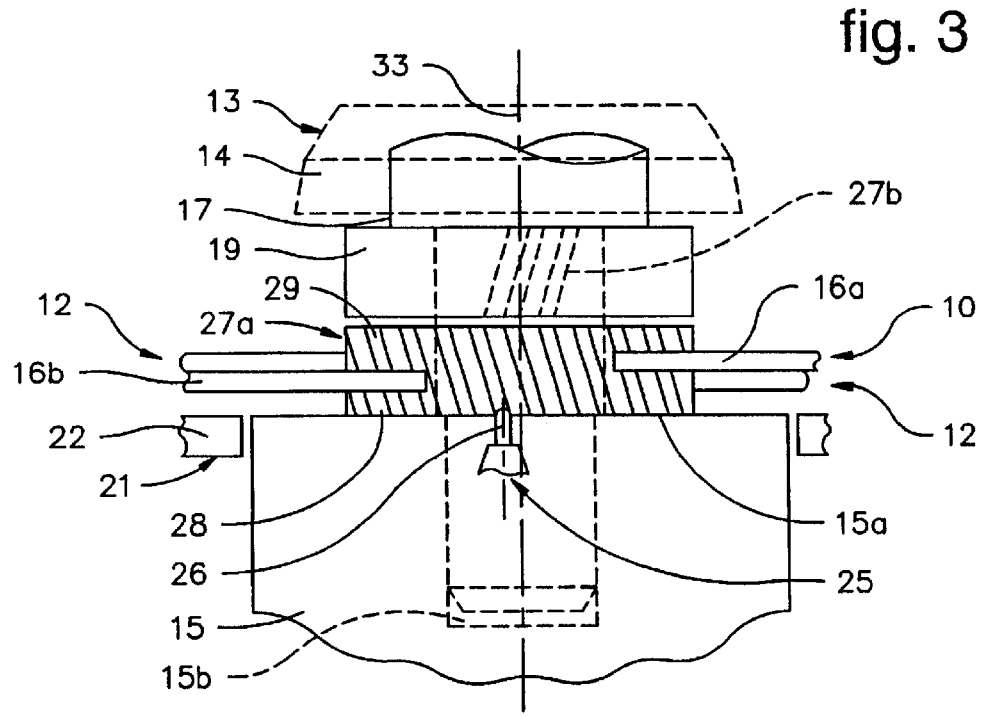
FIG. 3 shows a variant of FIG. 2 when double-toothing sprocket wheels are in production.

In the production of double-toothing sprocket wheels 11, the loader 10 cooperates with a centering device 25, which is the subject of a separate patent title, and is shown only partly in FIG. 3.

The case shown here refers to a double-toothing sprocket wheel 11 with sloping teeth, of the bi-helical type, but the invention may be applied in the same way to sprocket wheels 11 with straight double-toothing.

In the case of double-toothing sprocket wheels 11, the production cycle has the rings 27a, 27b of teeth 28 achieved in two successive steps.

The loader 10 is therefore loaded with pieces which have the first ring 27a already formed and the partly worked piece has to be positioned with respect to the piece-bearing table so that the second ring 27b can be made.

The desired precise reciprocal angular positioning between the teeth 28 of the first ring 27a and of the second ring 27b is obtained by means of the centering device 25.

In this case, the centering device 25 comprises a retractable pin 26 protruding from the supporting base 15 and solidly rotating with the supporting base 15 of the piece-bearing table.

The positioning procedure is shown in FIGS. 4a, 4b, 4c.

When work on the piece has been completed, the retractable pin 26 may be in any circumferential position of the supporting base 15, for example in the position referenced by 26a in FIG. 4a.

After the pinion instrument 14 has been placed in a position of non-contact, the supporting base 15 is rotated from this position in either one direction (32a) or another (32b) so as to carry the retractable pin 26 into a position of alignment along the straight line orthogonal to the inner and outer lines tangent to the ideal position of the piece 19 with respect to the piece-bearing table; this straight line coincides, in this case, with the conjunction of the centres of rotation of the loader 10 and the supporting base 15.

When the supporting base 15 has reached this position, it is stopped, to define the reference position of the piece 19 to be worked with respect to the start-of-work position of the pinion instrument 14.

It should be noted that the rotation of the piece-bearing table is always connected by means of a kinematic chain (either mechanical or electric) to the rotation of the pinion instrument 14.

This condition of alignment corresponds with the position of outer tangency 26b (continuous line in FIG. 4b) or of inner tangency 26c (shown by a line of dashes in FIG. 4b) to the piece 19 to be worked when, in the following step, the said piece 19 is carried to the working position so that the second ring 27b of teeth can be made. To be more exact, when the loader 10 is rotated to carry the piece 19 into correspondence with the operating station defined by the supporting base 15, the retractable pin 26 is inserted between two teeth 28 of the first ring 27a, coming into contact therewith and clamping the piece 19 in the correct reference position.

This clamping action causes a rotation movement to adjust the piece 19 in the opposite direction to the direction of advance given by the rotation of the turntable element 12.

In one embodiment, the upper shape of the retractable pin 26 can be such that, when it is inserted inside the groove 29 between two teeth 28, it causes contact points with the walls of the teeth 28 lying on the pitch circle of the said teeth 28. When the positioning procedure is complete, the pinion instrument 14 is taken back to its working position so as to make the second ring 27b of teeth on the piece 19.

It is understood that the teachings of the invention which are valid for circular loaders 10 can be directly transferred to round loaders either including a conveyor belt or any other type.

What is claimed is:

1. A loader for sprocket wheels cooperating with a machine to obtain sprocket wheels generated by cutting blades or pinion instruments, the machine including a piece-bearing table with a supporting base rotating around an axis and a centering device associated with the piece-bearing table, a turntable element advancing step-by-step in cooperation with the axis of rotation of the supporting base, the turntable element including on its periphery a plurality of housing seatings which accommodate pieces to be worked, each housing seating is able to be positioned in cooperation with an operating station of the pinion instruments and a replacement station to discharge completed sprocket wheels and to replace the pieces, the housing seatings including an aperture through which the pinion instrument passes, the housing seatings being defined by gripping arms which surround the piece for the whole of its perimeter except for the aperture, the gripping arms being movable to accommodate various sized pieces.

2. The loader as in claim 1, characterized in that the gripping arms have an intrinsic function of self-centering and positioning the piece with respect to a work station.

3. The loader as in claim 1, characterized in that the turntable element comprises a pair of discs, an upper disc and a lower disc which include on their periphery a plurality of respective gripping arms, the gripping arms of the first disc facing opposite the gripping arms of the second disc, each gripping arm of the first disc defining with a mating gripping arm of the second disc a relative housing seating and a relative front aperture.

4. The loader as in claim 3, characterized in that the gripping arms are arc shaped.

5. The loader as in claim 1, characterized in that the turntable element cooperates with a sliding support for the pieces underneath the housing seatings.

6. The loader as in claim 1, characterized in that the turntable element cooperates with the centering device to center the piece to be worked which is rotationally solid with the piece-bearing table, the piece-bearing table with the centering device including a defined start-of-work position with respect to the pinion instrument.

7. A method to automatically position sprocket wheels with double, straight or bi-helical toothing, using a loader and a centering device to center a piece, solidly rotating with a supporting base and including an insertion device cooperating with teeth and grooves of a first ring which has already been formed, the insertion device including an operating position in contact with at least one tooth of the piece rotating with the loader, the method being characterized in that it includes the following steps in sequence:

a pinion instrument is positioned in a position of non-contact with the first sprocket wheel when a first sprocket wheel has been worked;

the supporting base is rotated to carry the insertion device from an angular end-of-working position to at least one of a first and second position aligned with a straight line orthogonal to inner and outer lines tangent to an ideal position of the piece on a piece-bearing table; and the loader advances to carry the piece into correspondence with the supporting base with a resulting contact between the insertion device, clamped in at least one of the first and second positions, with at least a tooth of the first ring with an adjustment rotation of the piece and a resulting clamping of the piece into the desired angular start-of-work position with respect to the pinion instrument.

* * * * *